US011061903B1

(12) United States Patent
Goel et al.

(10) Patent No.: US 11,061,903 B1
(45) Date of Patent: Jul. 13, 2021

(54) METHODS AND SYSTEMS FOR AN IMPROVED DATABASE

(71) Applicant: Amazon Technologies, Inc., Seattle, WA (US)

(72) Inventors: Niket Goel, Seattle, WA (US); Tengiz Kharatishvili, Sammamish, WA (US); Alexandre Olegovich Verbitski, Woodinville, WA (US); Stefano Stefani, Issaquah, WA (US); Alok Nikhil, Seattle, WA (US); Saileshwar Krishnamurthy, Palo Alto, CA (US); Kamal Kant Gupta, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 15/280,613

(22) Filed: Sep. 29, 2016

(51) Int. Cl.
G06F 16/2455 (2019.01)
G06F 3/06 (2006.01)
G06F 16/22 (2019.01)

(52) U.S. Cl.
CPC ...... *G06F 16/24552* (2019.01); *G06F 3/0607* (2013.01); *G06F 3/0631* (2013.01); *G06F 3/0685* (2013.01); *G06F 16/2246* (2019.01)

(58) Field of Classification Search
CPC .. G06F 17/3048; G06F 3/0607; G06F 3/0631; G06F 3/0685; G06F 17/30327
USPC .............................. 707/770, 707
See application file for complete search history.

(56) References Cited

U.S. PATENT DOCUMENTS

| | | | | |
|---|---|---|---|---|
| 2008/0086470 | A1* | 4/2008 | Graefe | G06F 17/30327 |
| 2008/0183688 | A1* | 7/2008 | Chamdani | G06F 17/30442 |
| 2010/0146003 | A1* | 6/2010 | Bruso | G06F 16/2246 707/797 |
| 2010/0281013 | A1* | 11/2010 | Graefe | G06F 17/30327 707/715 |
| 2013/0238576 | A1* | 9/2013 | Binkert | G06F 17/30961 707/695 |
| 2013/0318126 | A1* | 11/2013 | Graefe | G06F 17/30327 707/797 |
| 2013/0346725 | A1* | 12/2013 | Lomet | G06F 12/10 711/206 |
| 2014/0040199 | A1* | 2/2014 | Golab | G06F 17/30309 707/634 |

(Continued)

*Primary Examiner* — Hosain T Alam
*Assistant Examiner* — Nicholas E Allen
(74) *Attorney, Agent, or Firm* — Eversheds Sutherland (US) LLP

(57) ABSTRACT

Systems, methods, and computer-readable media are disclosed for an improved database. The systems, methods, and computer-readable media described herein may enhance the response time of databases and improve user experiences. In an example method described herein, a database may receive a search request for data stored in the database. The database may be stored in association with a b-tree to facilitate searching and retrieving data from the database. The method may include allocating a portion of a first memory for read ahead operations and performing the read ahead operations, wherein the read ahead operations comprise loading, into the portion of the first memory, data associated with one or more siblings of a current node, wherein the one or more siblings of the current node are one or more nodes that have a same number of parent nodes as the current node.

20 Claims, 12 Drawing Sheets

(56) References Cited

U.S. PATENT DOCUMENTS

| | | | |
|---|---|---|---|
| 2014/0195542 A1* | 7/2014 | Larson | G06F 16/24554 707/741 |
| 2015/0186283 A1* | 7/2015 | Mungikar | G06F 12/12 711/133 |
| 2015/0277969 A1* | 10/2015 | Strauss | G06F 9/466 707/703 |
| 2016/0055220 A1* | 2/2016 | Joshi | G06F 3/04842 707/722 |

* cited by examiner

METHODS AND SYSTEMS FOR AN IMPROVED DATABASE

BACKGROUND

Users and businesses may store information in a variety of databases having different structures. The users and businesses may update the information stored in such databases periodically. Similarly, users and businesses may retrieve information stored in such databases by providing search parameters (e.g., a search query) or the like. In many cases, performing such searches may be time consuming and resource intensive. Such operations may slow down the response time of the database, because segments of the information stored in the database may be sequentially retrieved to determine whether these segments satisfy the search parameters.

Naturally, the ability to perform the operations described above in a faster and more efficient manner can significantly enhance the response time of databases. In turn, this may reduce the associated maintenance and management costs of the database while enhancing the user experience and satisfaction. Accordingly, there exists a dire market need for systems and methods that can enhance the performance of databases.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for accessing and searching databases, and in particular improving database access and data retrieval from databases.

Generally, a database may include memory devices for use in conjunction with a database data structure to store and/or retrieve data onto and/or from the database. In one implementation, the data structure may be, for example, a balanced search tree (b-tree hereinafter) structure. The memory devices may include high speed memory (e.g., RAM) and/or a low speed memory (e.g., a hard drive). Naturally, the memory may be volatile or non-volatile memory. While non-volatile memory operates at a slower speed, data may be safely stored on non-volatile memory without the non-volatile memory being powered (e.g., turned off). To the contrary, volatile memory operates at a higher speed but does not preserve the stored data when the volatile memory is not powered (e.g., turned off). The present disclosure describes systems and methods for efficiently utilizing volatile and non-volatile memory to enhance the performance of databases.

Figure 1:
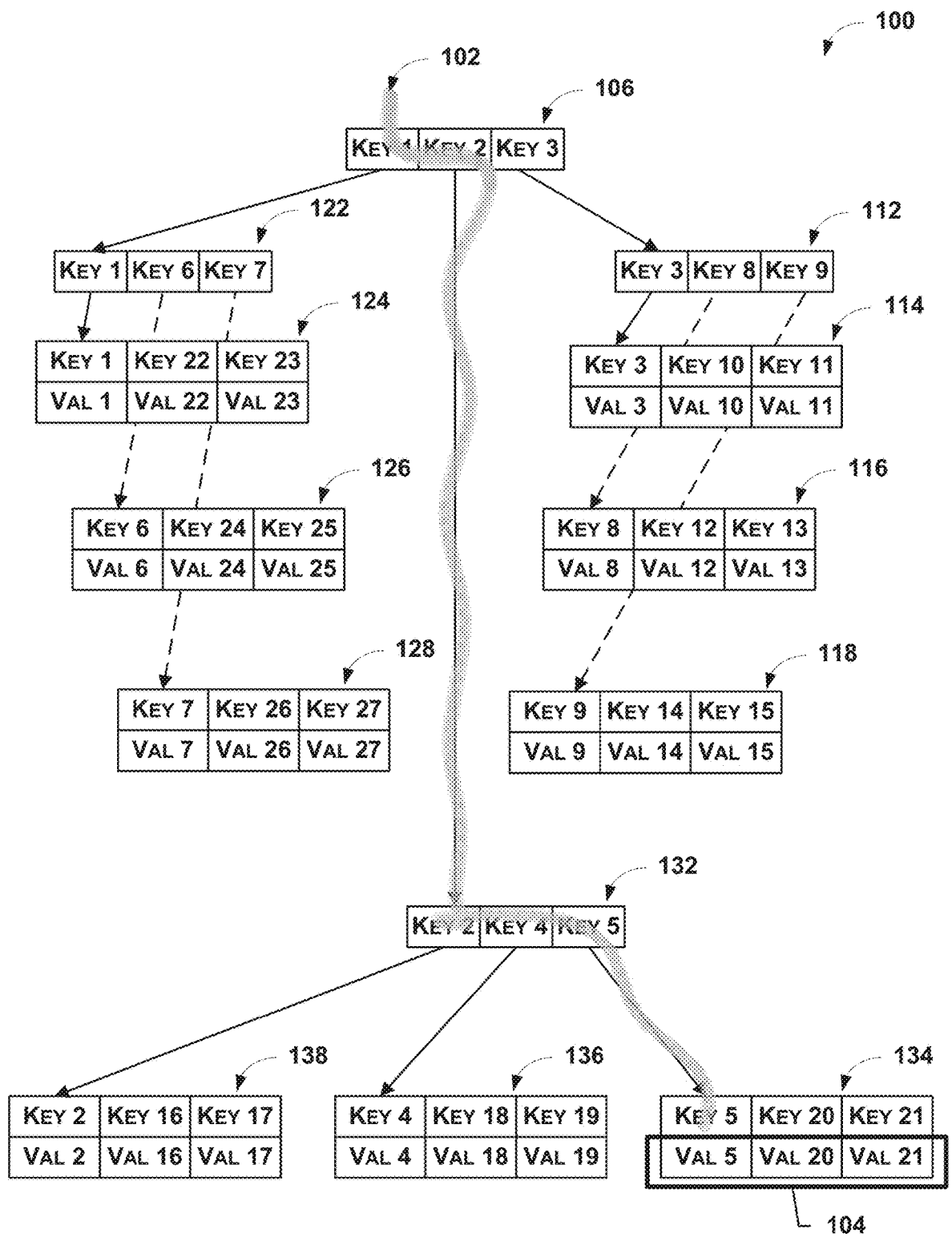
FIGS. 1-3 illustrate a database structure and search processes in accordance with one or more example embodiments of the disclosure.

As discussed, the database may be stored in association with a b-tree structure. The b-tree structure may be a multi-level storage hierarchy of storage elements (e.g., data, segmented data, database enemies, and/or the like) having differing storage characteristics. FIG. 1 illustrates an example b-tree 100 where one or more devices may operate in accordance with one or more example embodiments of the disclosure. In some implementations, the b-tree may include a root node 106, branch nodes 112, 122, and 132, and leaf nodes 114, 116, 118, 124, 126, 128, 134, 136, and 138. Generally, a root node may be a node that has no parent node but one or more child nodes. A branch node may be a node that has at least one parent node and at least one child node. A leaf node may be a node that has at least one parent node but no child nodes. In one implementation, the root node and the branch nodes may include only keys, while the leaf nodes include keys and data. For example, a key-value pair may be a pair of two linked data items. A key may be a unique identifier for a particular data item. The value may be the data item or a pointer to the data item. Key-value pairs enable the efficient searching for data items. For example, the key-value pairs may facilitate locating and fetching particular data items.

The root and branch nodes support quick searching among the leaf nodes. The keys may be used to navigate or traverse the b-tree. For example, keys of nodes of the b-tree may be compared with a target key or key range. At each traversed node, the path forward may be determined based on the comparison. For example, the path 102 shows an illustrative traversal of the b-tree. When each key is traversed by the path 102, a comparison is made between the target key and the respective traversed key. For example, according to path 102, Key 1 of node 106 was traversed, and a comparison may be made with a target key. In response to the comparison, the path 102 may move to Key 2 of node 106. Again a comparison may be performed and, based on the comparison, the path 102 may proceed to Key 2 of node 132. In turn, Key 4 of node 132 may be compared with the target key, and based on the comparison, the path 102 may move to Key 5 of node 132. A similar comparison may then be made between the target key and Key 5 of node 132. Based on the comparison, the path 102 may then reach Key 5 of node 134.

The data associated with the leaf nodes may be stored in an arbitrary order on the hard drive. For example, the position on the hard disk may not correspond to a logical position according to the b-tree. In one example, the logical position of a data item may be defined by the position of a corresponding node of the b-tree. For example, two neighboring or adjacent nodes of the b-tree may be nodes that have proximate logical positions. The logical position according to the b-tree allows faster access (e.g., search, query and/or the like) of data on the hard drive by navigating or traversing the b-tree. In some implementations, data may be fetched from the hard disk and loaded into RAM to facilitate faster access of the data. In some implementations, data may be fetched from the hard disk prior to the data being requested ("pre-fetched"). For example, when a request to fetch data from a particular sector of the hard drive is made, data stored on neighboring portions of the hard drive may be pre-fetched. However, as described, the data may not be stored in a sequential or contiguous manner on the hard disk. Therefore, the pre-fetched data may not be highly relevant or may be less likely to be requested for fetching. In order to pre-fetch more relevant data, data may be pre-fetched based on the b-tree.

Generally, pre-fetching operations may be initiated in response to determining or detecting a pattern of traversal of the b-tree. Once the pattern is determined, the pre-fetching operations may be initiated to pre-fetch data likely to be requested prior to the request. The data likely to be requested may be determined based on the pattern. In one implementation, a database management system may use a cursor and/or a pointer (not shown) to track the path 102 of the b-tree 100 traversal. The database management system may determine that the cursor moved in a particular direction for a threshold percentage of movements during traversal of the b-tree 100. For example, the database management system may determine that the cursor moved, with reference to the visual representation of FIG. 1, downward and to the right (sometimes referred to as forward) during 100% of all traversal movements. In one implementation, the threshold may be 50%, 80% and/or the like. FIG. 1 shows a b-tree having a plurality of nodes 106-138. The nodes may include key-value pairs as described above. A traversal path 102 shows traversal of the b-tree. For example, the traversal may move forward for 50% of all traversal movements. In response to the determination, the database management system may pre-fetch consecutive data in the same direction. The data that is consecutive and to the right of Key 5 and Val 5 may be pre-fetched. For example, responsive to the determination and the cursor being at Key 5 of node 134, the database management system may pre-fetch the data 104. The data 104 may include Val 5, Val 20 and Val 21. Additionally, the data 104 may include Key 5, Key 20 and Key 21.

Figure 2:
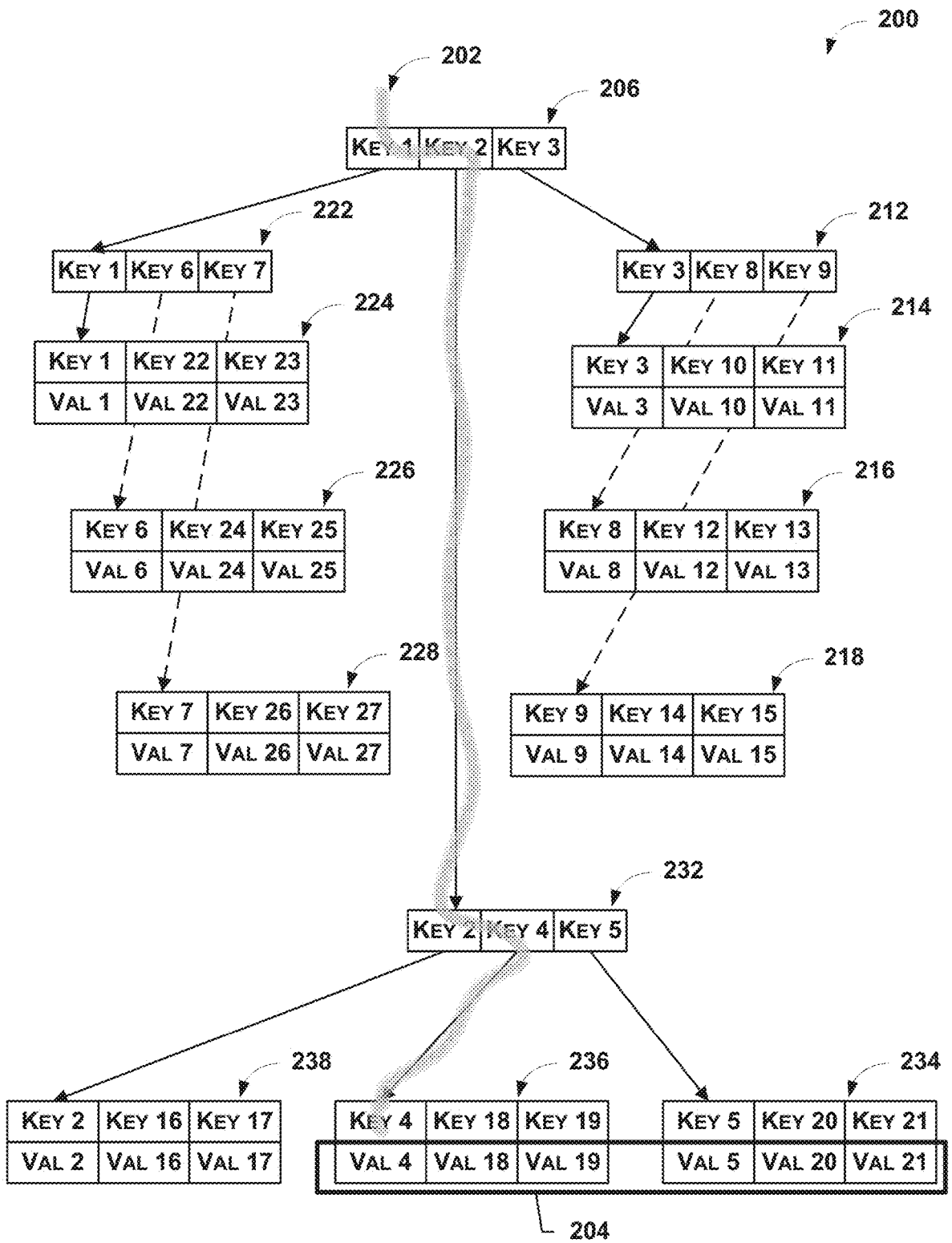

FIG. 2 depicts a b-tree 200 similar to the b-tree 100. However, the traversal path 202 is different from the traversal path 102. The traversal path 202 may be currently at Key 4. In this example, data to the right of Key 4 and Val 4 may be pre-fetched, because the traversal path of the b-tree 200 is in the right direction, as shown. For example, data 204 may be pre-fetched. The data 204 may include Val 4, Val 18, Val 19, Val 5, Val 20, and Val 21.

Figure 3:
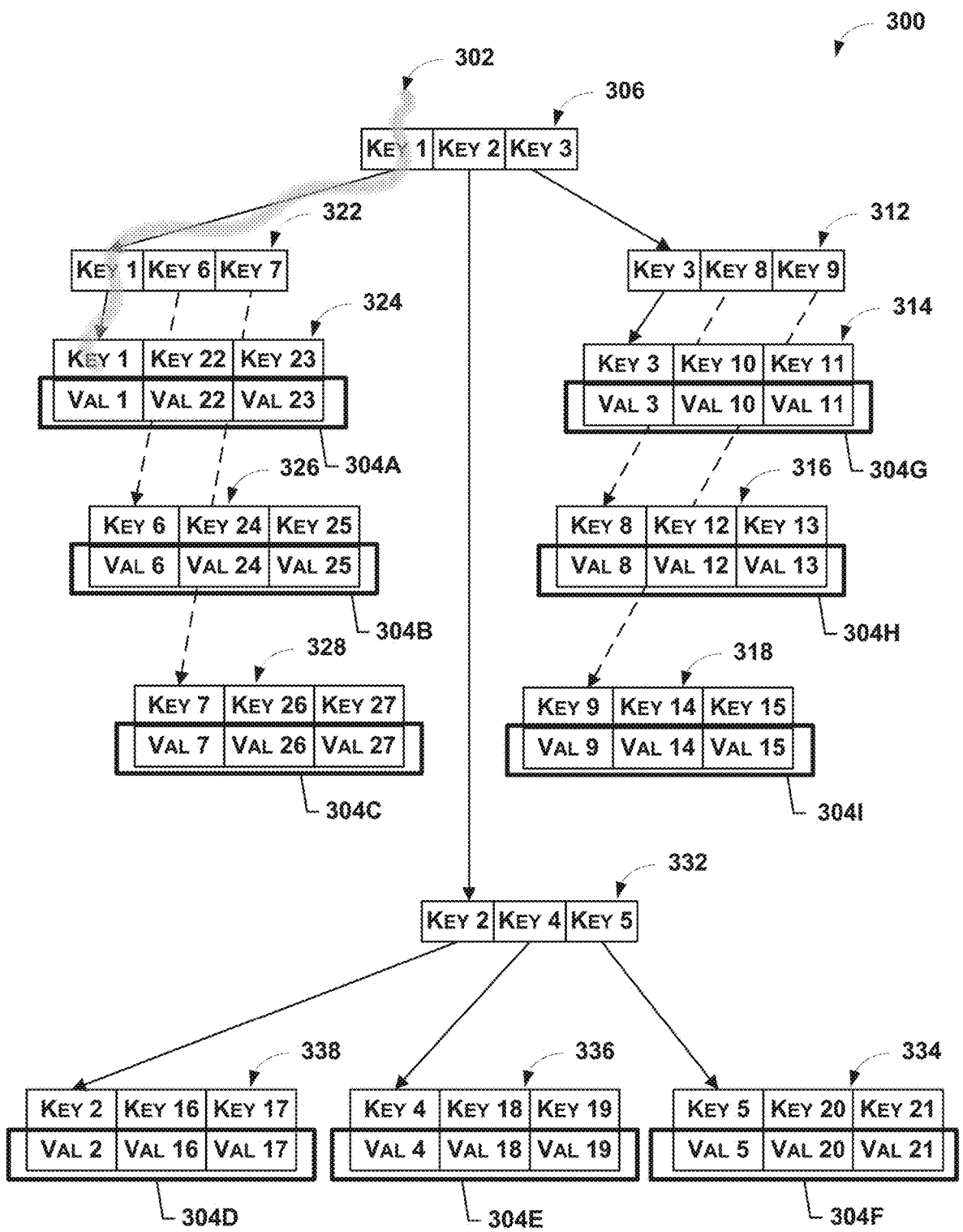

Similarly, FIG. 3 depicts a b-tree 300 similar to the b-trees 100 and 200. However, the traversal path 302 is different from the traversal paths 102 and 202. In this example, data to the right of Key 1 and Val 1 may be pre-fetched. For example, data 304A-304I may be pre-fetched. The data 304A-I may include all data associated with the b-tree 300. In some instances, the database management system may determine that a search request requires fetching all data associated with the b-tree. In such an example, pre-fetching may be initiated based on the determination that fetching all data associated with the b-tree 300 is required based on the search request. For example, particular search request types may require fetching of all data associated with the b-tree 300. In one implementation, the determination that fetching all data associated with the b-tree 300 is required based on the search request. In one example, the data 304A-304I may be sequentially pre-fetched and loaded into RAM once the search request is received. In some implementations, the database management system may selectively pre-fetch any combination of data 304A-304I. In one example, the system may pre-fetch the data sequentially based on the amount of memory (e.g., RAM) available for the pre-fetching operations. For example, the memory available for pre-fetching may not fit the data 304A-304I simultaneously. Accordingly, the database management system may pre-fetch 304A-304C followed by 304D-304F. The database management system may continue to pre-fetch other portions of the data 304A-304I sequentially as memory becomes available.

In one implementation, a database management system may determine an amount of memory available for pre-fetching operations. For example, the amount of available memory for pre-fetching operations may be determined based on multiple parameters. In some implementations, the parameters may include the number of cores of a machine hosting and/or managing the database. In one implementation, the number of users accessing the database or programmatically expected number of users to access the database may be a parameter. In some implementation, the overall computational stress on the database or programmatically expected computational stress on the database may also be a parameter. In some implementations, the memory available for pre-fetching operations may be adjusted dynamically based on one or more of the parameters described herein. In some implementations, a portion of the available memory may be allocated to pre-fetching operations by the database management system. The database management system may determine a current computational processing load of the database and allocate a portion of the memory for pre-fetching operations accordingly. When that database is experiencing high levels of stress the database management system may allocate less memory for pre-fetching operations than when the database is experiencing low levels of stress. In one implementation, the database management system may receive an API call from a user indicating a portion of memory to be allocated to pre-fetching operations. In one example, the allocated portion of the memory may be determined and allocated based on the speed of processing of the database. For example, the amount of memory allocated for pre-fetching may be allocated such that the processors experience very minimal or no delays. For example, pre-fetching data faster than the processors can process data may not result in response speed improvements for the database. This may decrease the overall efficiency of the database by utilizing limited resources without yielding significant advantages. Accordingly, the processor's throughput rate may be measured or determined. Based on the throughput, a portion of the memory may be allocated to pre-fetching operations. For example, the size of the memory portion may be determined such that the processor constantly has all data it can simultaneously process readily available in the portion of the memory.

In one implementation, the processing speed of each processing core of the database may be calculated. A throughput may be calculated for all or some of the cores of the database. In one example, the throughput may be the speed of processing of each core of an average size of the data associated with each key from the b-tree. In turn, the throughput may be used to determine a memory size for allocation to the pre-fetching operations. In some implementations, the size of the memory allocated may depend on the amount of memory currently utilized by database functions (e.g., receiving requests, responding to requests, storing data and/or the like) other than the pre-fetching operations. In some implementations, the system may determine that data currently stored in the memory is not needed. Such data may, in turn, be removed or deleted for memory to allocate a larger portion of the memory to pre-fetching operations. In some implementations, a performance metric may be monitored while the pre-fetching operations are running. For example, the speed of operation during the traversal of the b-tree may be monitored. Responsive to detecting an increase in the speed of operation that exceeds a configurable threshold, the size of the allocated memory may be increased. Similarly, responsive to detecting an increase in the speed of operation that falls below the configurable threshold, the size of the allocated memory may be maintained or decreased.

Figure 4A:
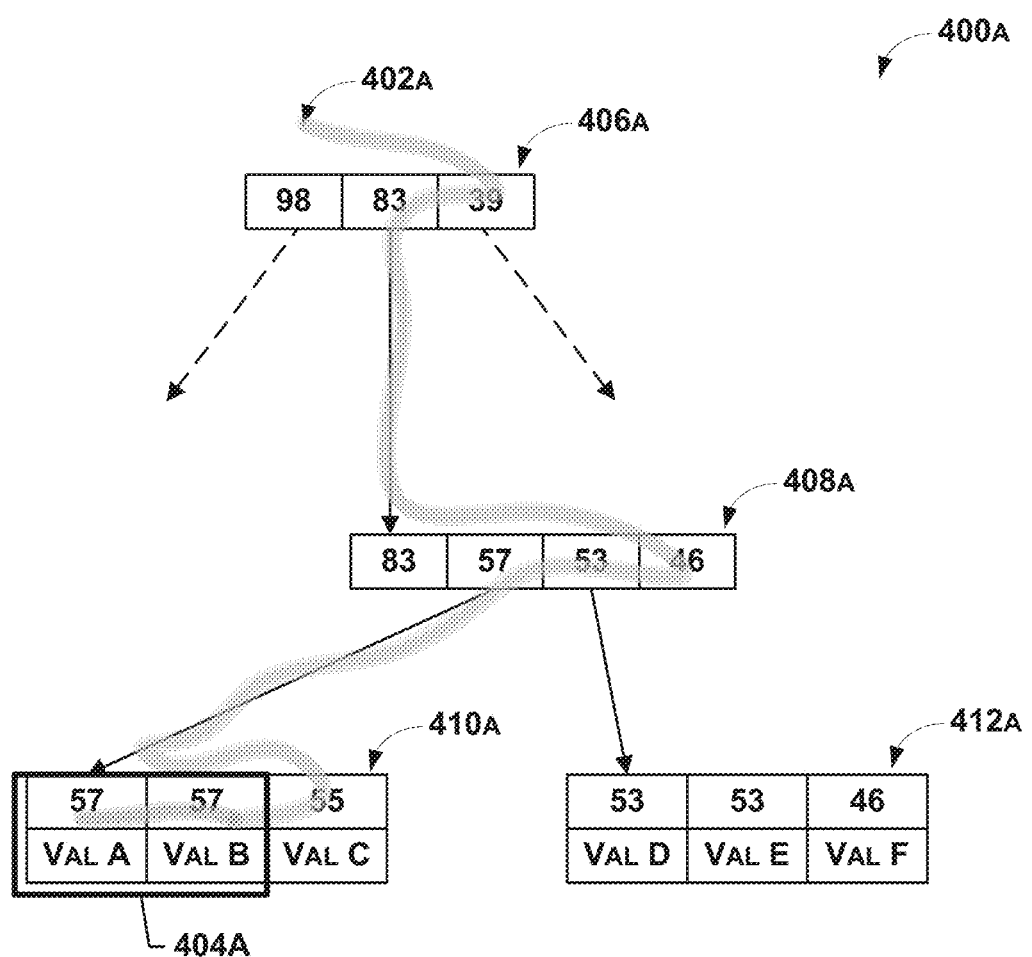
FIGS. 4A-4C illustrate example search processes and database structure traversal in accordance with one or more example embodiments of the disclosure.
Figure 4B:
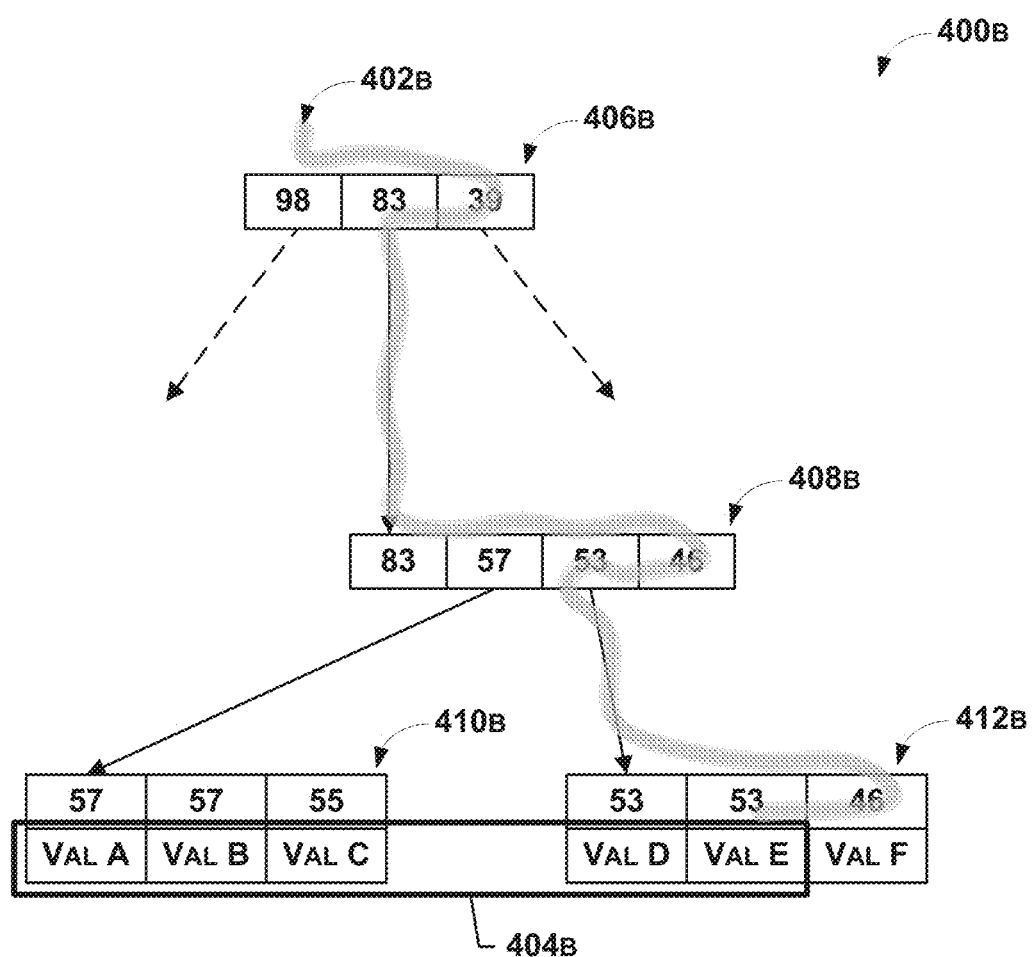
Figure 4C:
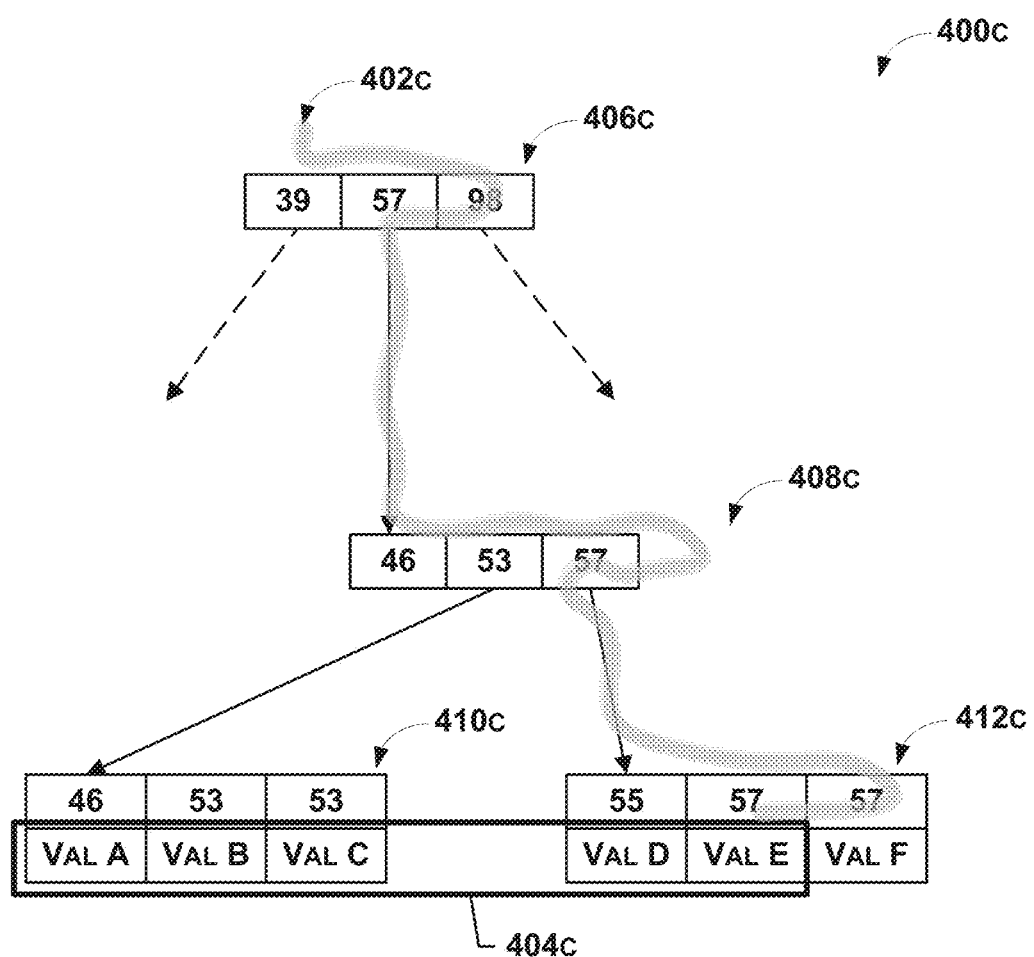

FIGS. 4A-4C each depict a portion of b-trees 400A and 400B respectively. B-trees 400A and 400B may be traversed downward and to the left (sometimes referred to as backwards). Accordingly, the pre-fetching operations described above may pre-fetch sequential data in the left direction. For example, the prefetching operations described above may pre-fetch data 404A and data 404B respectively.

Embodiments of the disclosure may improve the user experience and reduce the cost of device maintenance by read ahead operations similar to the operations described. In some implementations, some of the read ahead operations described herein may be referred to as logical read ahead operations. The logical read ahead operations may enhance the speed of searching and accessing data from databases. In turn, the user experience may be improved. Similarly, the upkeep cost may be reduced due to the hardware of the database being more efficient. For example, since the operations described herein may improve the response time of databases and provide more efficient access to the database, the power consumption and the computation stress on the database may be reduced.

The b-tree 100 has a depth of 3. However, it should be understood that the disclosure is not limited to a particular depth. For example, other databases may have a depth of 4, 8, 10, 40 and/or the like.

Illustrative Device Architecture

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Computing Device

Figure 5:
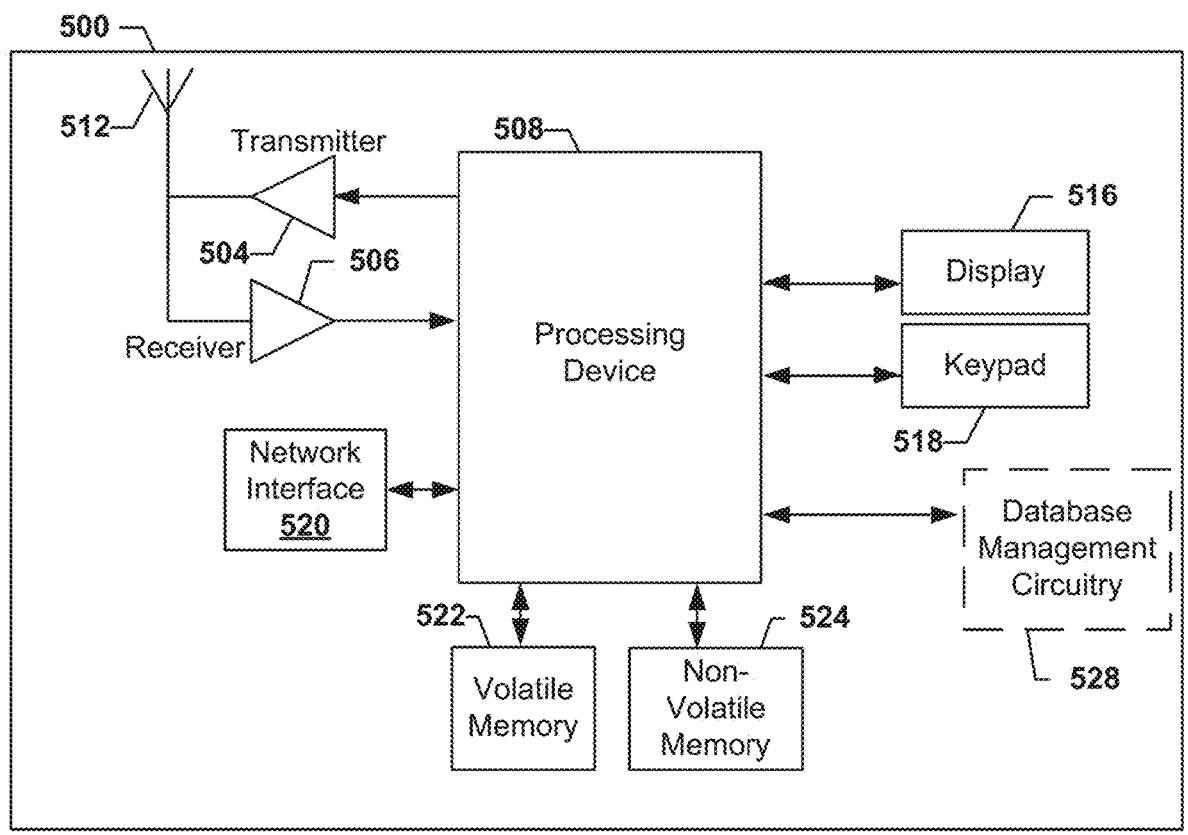
FIG. 5 illustrates an example schematic diagram of a computing device according to one or more example embodiments of the disclosure.

FIG. 5 illustrates an example schematic diagram of a computing device 500 and/or entity according to one or more example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The computing device 500 can be operated by various parties and/or automatically. As shown in FIG. 5, the computing device 500 can include an antenna 512, a transmitter 504 (e.g., radio), a receiver 506 (e.g., radio), and a processing device 508 (e.g., CPLDs, microprocessors, multi-core processors, co-processing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause the display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause the display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities. As will be recognized, these architectures and descriptions are provided for example purposes only and are not limited to the various embodiments.

The computing device 500 may optionally include database management circuitry 528. In one implementation, the database management circuitry 528 may be embodied as software executed on the processing device 508. In a different implementation, the database management circuitry 508 may be a processing device in communication with the processing device 508. The database management circuitry 528 may be responsible for managing one or more databases. In one implementation, the database management circuitry 508 may store and maintain a b-tree in association with each database. For example, the b-tree 100 may be used by the database management circuitry 528 to facilitate searching for data in the database 608 of FIG. 6. The database management circuitry 528 may receive and process search requests via the network interface 520. Similarly, referring to FIG. 6, the database management circuitry 528 may provide the search results to user devices 602A-602N and/or client devices 604A-604N. In some implementations, the server 610 may perform the operations described above with reference to the database management circuitry 528.

Database Management and Storage Service

As used herein, the term "database management and storage service" may include a service that is accessible via one or more computing devices and that is operable to receive data for storage onto one or more storage devices of the database management and storage service. The database management and storage service may also facilitate retrieval of data from the database storage devices. The data may be retrieved by the sorting entity/user device or by other entities or user devices. The stored data may be backed up in one or more additional storage devices to ensure that the data is preserved.

Figure 6:
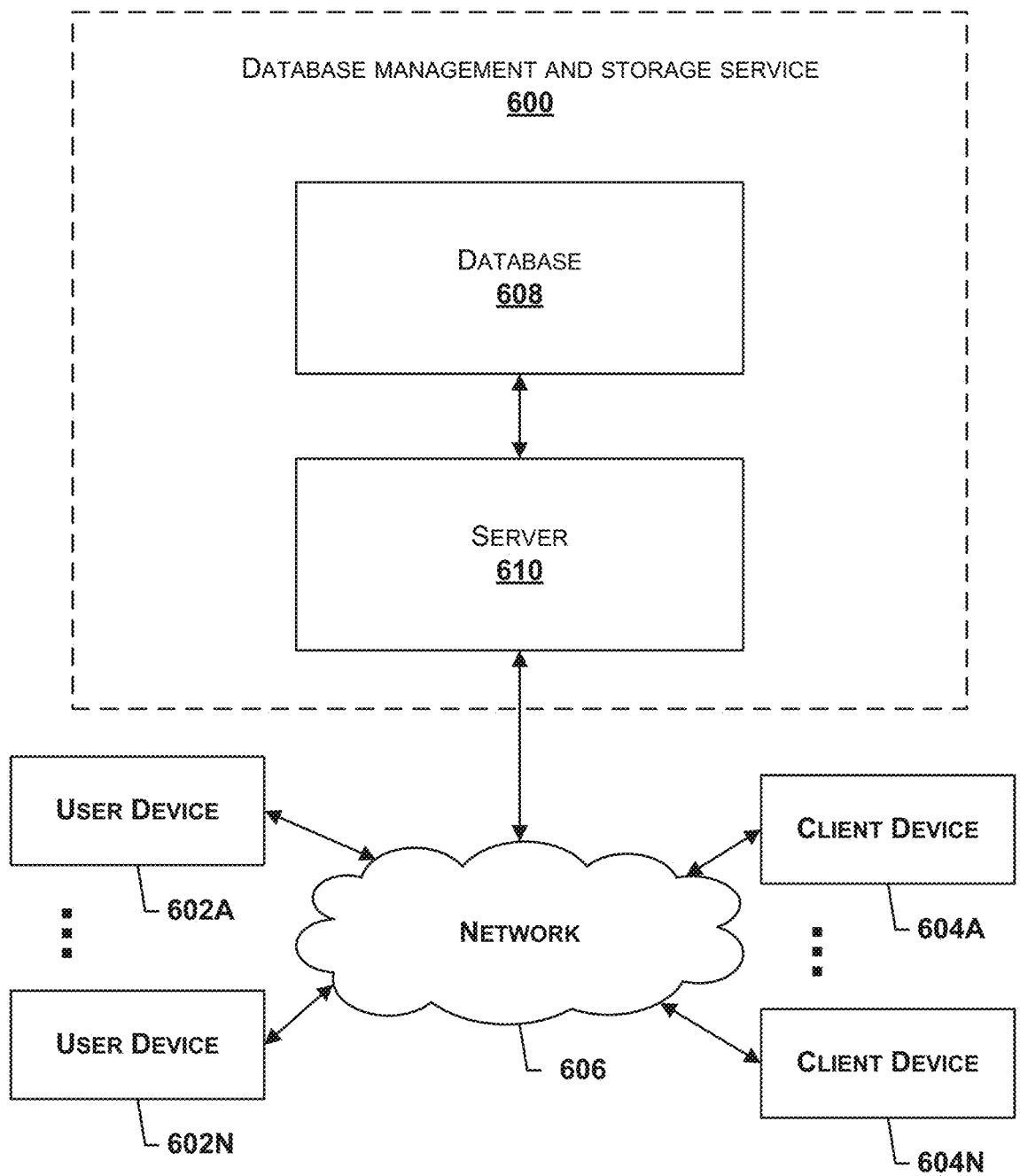
FIG. 6 illustrates an example environment at which one or more devices may operate according to one or more example embodiments of the disclosure.

FIG. 6 discloses an example database management and storage service within which embodiments of the present disclosure may operate. Clients may access a database management and storage service 600 via a network 606 (e.g., the Internet or the like) using one or more user devices 602A-602N or one or more client devices 604A-604N. Moreover, the database management and storage service 600 may comprise a server 610 in communication with a database 608.

The server 610 may be embodied as a computer or computers as described herein (e.g., computing device 500). The server 610 may provide for receiving electronic data from various sources including, but not necessarily limited to, the user devices 602A-602N or one or more client devices 604A-604N. For example, the server 610 may be operable to receive and process data provided by the client devices 604 for storage. Similarly, the server 610 may facilitate fetching of the stored data by the client devices 604 and/or the user devices 602. The server 610 may also track and log information associated with storage and retrieval of data. The information may be provided to a computing entity via network 606.

The database 608 may be embodied as a data storage device such as a Network Attached Storage (NAS) device or devices, or as a separate database server or servers. The database 608 includes information accessed and stored by the server 610 to facilitate the operations of the database management and storage service 600. For example, the database 608 may include, without limitation, user account credentials for system administrator privileges, access operations, data modifying operations and/or the like.

The user devices 602A-602N and the client devices 604A-604N may be any computing device as described above and operated by a user. Electronic data transferred between the server 610 and the user devices 602A-602N and the client devices 604A-604N may be provided in various forms and via various methods. For example, the user devices 602A-602N and the client devices 604A-604N may include desktop computers, laptop computers, smartphones, netbooks, tablet computers, wearables, and the like. The information may be provided through various sources on these devices. In one implementation, a user or a client device may be a second server (not shown) or a second database management and storage service. For example, the operations described herein may be performed between two servers and/or two databases In embodiments where a user device 602 or a client device 604 is a mobile device, such as a smartphone or tablet, the user device 602 or the client device 604 may execute an "app" to interact with the database management and storage service 600. Such apps are typically designed to execute on mobile devices, such as tablets or smartphones. For example, an app may be provided that executes on mobile device operating systems. These platforms typically provide frameworks that allow apps to communicate with one another and with particular hardware and software components of mobile devices. Communication with hardware and software modules executing outside of the app may be provided via application programming interfaces (APIs) provided by the mobile device operating system.

Additionally or alternatively, the user device 602 or the client device 604 may interact through the database management and storage service 600 via a web browser. As yet another example, the user device 602 or the client device 604 may include various hardware or firmware designed to interface with the database management and storage service 600 (e.g., where the user device 602 or the client device 604 is a purpose-built device offered for the primary purpose of communicating with the database management and storage service 600).

EXAMPLE OPERATION OF ILLUSTRATIVE
EXAMPLE EMBODIMENTS

FIGS. 1-3 illustrate a database structure and search processes in accordance with one or more example embodiments of the disclosure. In one example, the b-trees 100, 200 and 300 may be the same or similar b-trees. In one example, each of the traversal paths 102, 202 and 302 are different traversal paths of the b-trees. Since data may be stored non-sequentially or in a non-contiguous manner in the database 608 (e.g., hard disk), the b-trees 100, 200 and 300 may be utilized to search for data stored in the database 608 and fetch the data, by processing device 508, for loading in the volatile memory 522.

As described herein, a portion of the volatile memory 522 may be allocated for pre-fetching operations. For example, an amount of available memory for pre-fetching operations may be determined based on multiple parameters. In some implementations, the parameters may include the number of cores of a machine hosting and/or managing the database management and storage service 600. In one implementation, the parameters may include the number of users accessing the database management and storage service 600 or a programmatically expected number of users accessing the database management and storage service 600. In some implementations, the overall computational stress on the database management and storage service 600 or the programmatically expected computational stress on the database management and storage service 600 may also be a parameter. In some implementations, the memory available for pre-fetching operations may be adjusted dynamically based on one or more of the parameters described herein. In some implementations, a portion of the available memory may be allocated to pre-fetching operations. In one example, the allocated portion of the memory may be determined based on the speed of processing of the database management and storage service 600. For example, the amount of memory allocated for pre-fetching may be allocated such that processors (e.g., the server 610, the processing device 508 and/or the like) may experience very minimal or no delays. For example, pre-fetching data faster than the processors (e.g., the server 610, the processing device 508 and/or the like) can process data may not result in response speed improvements for the database. This actually may decrease the overall efficiency of the database management and storage service 600 by utilizing limited resources without yielding significant advantages.

The database management and storage service 600 may receive a request to search for a target key or a target key range associated with data stored in the database 608. The database may be traversed in a forward direction (downward and to the right) as shown in FIGS. 1-3. With reference to FIG. 1, the traversal path 102 begins at node 106 at Key 1. Key 1 may be compared with the target key or the target key range. Based on the comparison, the traversal path 102 may continue to Key 2. In one example, in response to finding that Key 1 is larger than the target key or the target key range, the traversal path 102 may continue to Key 2. In a different example, in response to finding that Key 1 is smaller than the target key or the target key range, the traversal path 102 may continue to Key 2. Similarly in response to a comparison of Key 2 with the target key or the target key range, the traversal path 102 may continue to node 132. In turn, the traversal path may continue to the comparisons and traverse Key 4 and Key 5 of node 132 to progress to Key 5 of node 134. At any point during the traversal, the database management and storage service 600 may determine that the nodes of b-tree 100 are being traversed in a particular direction for, at least, a threshold percentage of the traversals of b-tree 100. For example, by reaching Key 5 of node 134, the database management and storage service 600 may determine that 50% of the traversal of b-tree 100 is in the forward direction. In response, the database management and storage service 600 may pre-fetch data associated with nodes that are in the same direction of the traversal path 102. For example, the database management and storage service 600 may pre-fetch data associated with nodes that are in the forward direction relative to Key 5 of node 134. Accordingly, the database management and storage service 600 may pre-fetch the data 104 and load the data 104 into the volatile memory 522. The pre-fetched data 104 may include Val 5, Val 20 and Val 21, which are associated with Key 5, Key 20 and Key 21, respectively. As described herein, a cursor (not shown) or other tracking mechanisms (e.g., tracking code having a visual indicator or tracking code not having a visual indicator) that indicates a current node that the traversal path 102 is currently on.

In some implementations, the search requests may be received in batches. In some implementations, the database management and storage services 600 may have multiple databases 608. In some implementations, each database 608 may be associated with at least one server 610. The operations associated with the batch search requests may be divided by the database management and storage services 600 such that the requests are routed to different databases 608. The workload associated with the operations may be divided based on the current computational stress on each database and associated server. For example, a first database and associated server may receive 50% of the batch requests, while a second and a third database and associated server may receive 25% each. The processing of the requests and the associated logical read ahead operations may be performed by the first, second, and third databases and associated servers simultaneously.

With reference to FIG. 2, b-tree 200 is generally similar to b-tree 100. However, the traversal path 202 is different from the traversal path 102. The traversal path 202 begins at node 206 at Key 1. Key 1 may be compared with the target key or the target key range. Based on the comparison, the traversal path 202 may continue to Key 2, as shown. In one example, in response to finding that Key 1 is larger than the target key or the target key range, the traversal path 202 may continue to Key 2 of node 202. In a different example, in response to finding that Key 1 is smaller than the target key or the target key range, the traversal path 202 may continue to Key 2. Similarly in response to a comparison of Key 2 with the target key or the target key range, the traversal path 202 may continue to node 232. In turn, the traversal path may continue to the comparisons and traverse Key 4 of node 232 to progress to Key 4 of node 236. At any point during the traversal, the database management and storage service 600 may determine that the nodes of b-tree 200 are being traversed in a particular direction for, at least, a threshold percentage of the traversals of b-tree 200. For example, by reaching Key 4 of node 236, the database management and storage service 600 may determine that 80% of the traversal of b-tree 200 is in the forward direction. In response, the database management and storage service 600 may pre-fetch data associated with nodes that are in the same direction of the traversal path 202. For example, the database management and storage service 600 may pre-fetch data associated with nodes that are in the forward direction relative to Key 4 of node 236. Accordingly, the database management and storage service 600 may pre-fetch the data 204 and load the data 204 into the volatile memory 522. The pre-fetched data 104 may include Val 4, Val 18, Val 19, Val 5, Val 20 and Val 21, which are associated with Key 4, Key 18, Key 19, Key 5, Key 20 and Key 21, respectively.

With reference to FIG. 3, b-tree 300 is generally similar to b-tree 100 and b-tree 200. However, the traversal path 302 is different from traversal paths 102 and 202. The traversal path 302 begins at node 306 at Key 1. Key 1 may be compared with the target key or the target key range. Based on the comparison, the traversal path 302 may continue to Key 1 of node 322, as shown. In one example, in response to finding that Key 1 is equal to the target key or within the target key range, the traversal path 302 may continue to Key 1 of node 322. At any point during the traversal, the database management and storage service 600 may determine that the nodes of b-tree 300 are being traversed in a particular direction for, at least, a threshold percentage of the traversals of b-tree 300. For example, by reaching Key 1 of node 322, the database management and storage service 600 may determine that 30% of the traversal of b-tree 300 is in the forward direction. In response, the database management and storage service 600 may pre-fetch data associated with nodes that are in the same direction of the traversal path 302. For example, the database management and storage service 600 may pre-fetch data associated with nodes that are in the forward direction relative to Key 1 of node 322. Accordingly, the database management and storage service 600 may pre-fetch the data 304 and load the data 304A-304I into the volatile memory 522. In some implementations, the data 304A-304I may be loaded into the volatile memory 522 sequentially. For example data 304A may be loaded into the volatile memory 522 first followed by data 304B. Because the allocated memory for pre-fetching may not fit all of the data 304A-304I simultaneously, the data loaded first into the volatile memory 522 may be deleted after a threshold period of time. The threshold period of time may be determined based on the speed of processing, for example. This may allow additional data to be pre-fetched. For example, the data 304A may be deleted or removed from the volatile memory 522 and, in turn, data 304C may be loaded into the memory. It should be understood that any combination of the data 304A-304I may be pre-fetched for loading into the volatile memory 522. In some implementations, all of the data 304A-304I may be loaded into the volatile memory 522. In other implementations, all of the data 304A-304I may be loaded into the volatile memory 522, in response to determining that the current search or request operation will require or will likely require fetching of all the data associated with b-tree 300.

FIGS. 4A-4C illustrate example search processes and database structure traversal in accordance with one or more example embodiments of the disclosure. A server 610 of the database management and storage service 600 may receive a request to search for target data associated with a key that is equal to 57. The traversal path 402A of this example is in the backward direction (downward and to the left). The traversal path 402A begins with comparing the key value of 39 to the target key value of 57. In response to determining that the target key value of 57 is greater than 39, the reversal path continues to the key value of 83 of node 406A. In turn, the target key value of 57 is compared with the key value of 83. In response to determining that the target key value of 57 is less than the key value of 83, the traversal path 402A proceeds downward to node 408A. The target key value of 57 is then compared to the key value of 46 of node 408A. In response to determining that the target key value of 57 is greater than the key value of 46, the traversal path 402A moves to the left direction within node 408A. The target value of 57 is compared to the key value of 53 and in response to determining that the target key value is greater than the key value of 53, the traversal path 402A moves to the left again. The target key value of 57 is then compared with the key value of 57. In response to determining that the target key value is equal to the key value of the current key being traversed by the path 402A, the traversal path 402A moves to node 410B. The key value of 55 is then compared to the target key value of 57 and the traversal path moves again to the left. The target key value of 57 is then compared with the key value of 57 and the data associated with the key of value 57 may be fetched. The process above may continue such that other data associated with a key having a value of 57 is fetched. At any point during the traversal the database management and storage service 600 may determine that the nodes of b-tree 400A are being traversed in a particular direction for, at least, a threshold percentage of the traversals of b-tree 400A. For example, reaching the key value of 55 at node 410A, the database management and storage service 600 may determine that 70% of the traversal of b-tree 400A is in the backward (downward and to the left) direction. In response, the database management and storage service 600 may pre-fetch data associated with nodes that are in the same direction of the traversal path 402A. For example, the database management and storage service 600 may pre-fetch data associated with nodes that are in the forward direction relative to the key value of 55 of node 410A. Accordingly, the database management and storage service 600 may pre-fetch the data 404A and load the data 404A into the volatile memory 522. The pre-fetched data 404A may include Val A and Val B, which are associated with the target key value of 57. As described herein, a cursor (not shown) or other tracking mechanisms (e.g., tracking code having a visual indicator or tracking code not having a visual indicator) that indicates a current node that the traversal path 402A is currently on.

With reference to FIG. 4B, the server 610 of the database management and storage service 600 may receive a request to search for target data associated with a key range that is larger than or equal to 53. The traversal path 402B of this example is in the backward direction (downward and to the left). The traversal path 402B begins with comparing the key value of 39 at node 406B to the target key range that is equal to or larger than 53. In response to determining that the key value of 39 is less than the target key range, the reversal path continues to the key value of 83 of node 406B. In turn, the target key range is compared with the key value of 83. In response to determining that the key value of 83 falls within the target key range, the traversal path 402B proceeds downward to node 412B. The target key range is then compared to the key value of 46 of node 412B. In response to determining that the key value of 46 is less than the target key range, the traversal path 402B may continue to the left direction. The target key range may then be compared with the key value of 53. The database management and storage service 600 may then determine that the key value of 53 falls within the target key range. In one implementation, once a match is found, the data 404B that is to the left of the match may be pre-fetched and loaded into the volatile memory 522. In some implementations, at any point during the traversal, the database management and storage service 600 may determine that the nodes of b-tree 400B are being traversed in a particular direction for, at least, a threshold percentage of the traversals of b-tree 400B. For example, reaching node 412B, the database management and storage service 600 may determine that 85% of the traversal of b-tree 400B is in the backward direction. In response, the database management and storage service 600 may pre-fetch data associated with nodes that are in the same direction of the traversal path 402B. For example, the management and storage service 600 may pre-fetch the data 404B. The data 404B includes Val A, Val B, Val C, Val D, and Val E that are respectively associated with key values between 53 and 57. Note that all of the key values fall within the target key range.

It should be understood that b-trees may be arranged in ascending or descending order and may be traversed forward and/or backwards. With reference to FIG. 4C, the server 610 of the database management and storage service 600 may receive a request to search for target data associated with a key range that is smaller than or equal to 57. The traversal path 402C of this example is in the backward direction (downward and to the left). The traversal path 402C begins with comparing the key value of 98 at node 406C to the target key range that is equal to or smaller than 57. In response to determining that the key value of 98 is larger than the target key range, the traversal path continues to the key value of 83 of node 406C. In turn, the target key range is compared with the key value of 57. In response to determining that the key value of 57 falls within the target key range, the traversal path 402C proceeds downward to node 412C. The target key range is then compared to the key value of 57 of node 412C. In response to determining that the key value of 46 is within the target key range, the traversal path 402C may continue to the left direction. The target key range may then be compared with the key value of 57. The database management and storage service 600 may then determine that the key value of 57 falls within the target key range again. In one implementation, once a match is found, the data 404C that is to the left of the match may be pre-fetched and loaded into the volatile memory 522. In some implementations, at any point during the traversal, the database management and storage service 600 may determine that the nodes of b-tree 400C are being traversed in a particular direction for, at least, a threshold percentage of the traversals of b-tree 400C. For example, reaching node 412C, the database management and storage service 600 may determine that 87% of the traversal of b-tree 400C is in the backward direction. In response, the database management and storage service 600 may pre-fetch data associated with nodes that are in the same direction of the traversal path 402C. For example, the management and storage service 600 may pre-fetch the data 404C. The data 404C includes Val A, Val B, Val C, Val D, and Val E that are respectively associated with key values between 46 and 57. Note that all of the key values fall within the target key range.

Illustrative Processes

Figure 7:
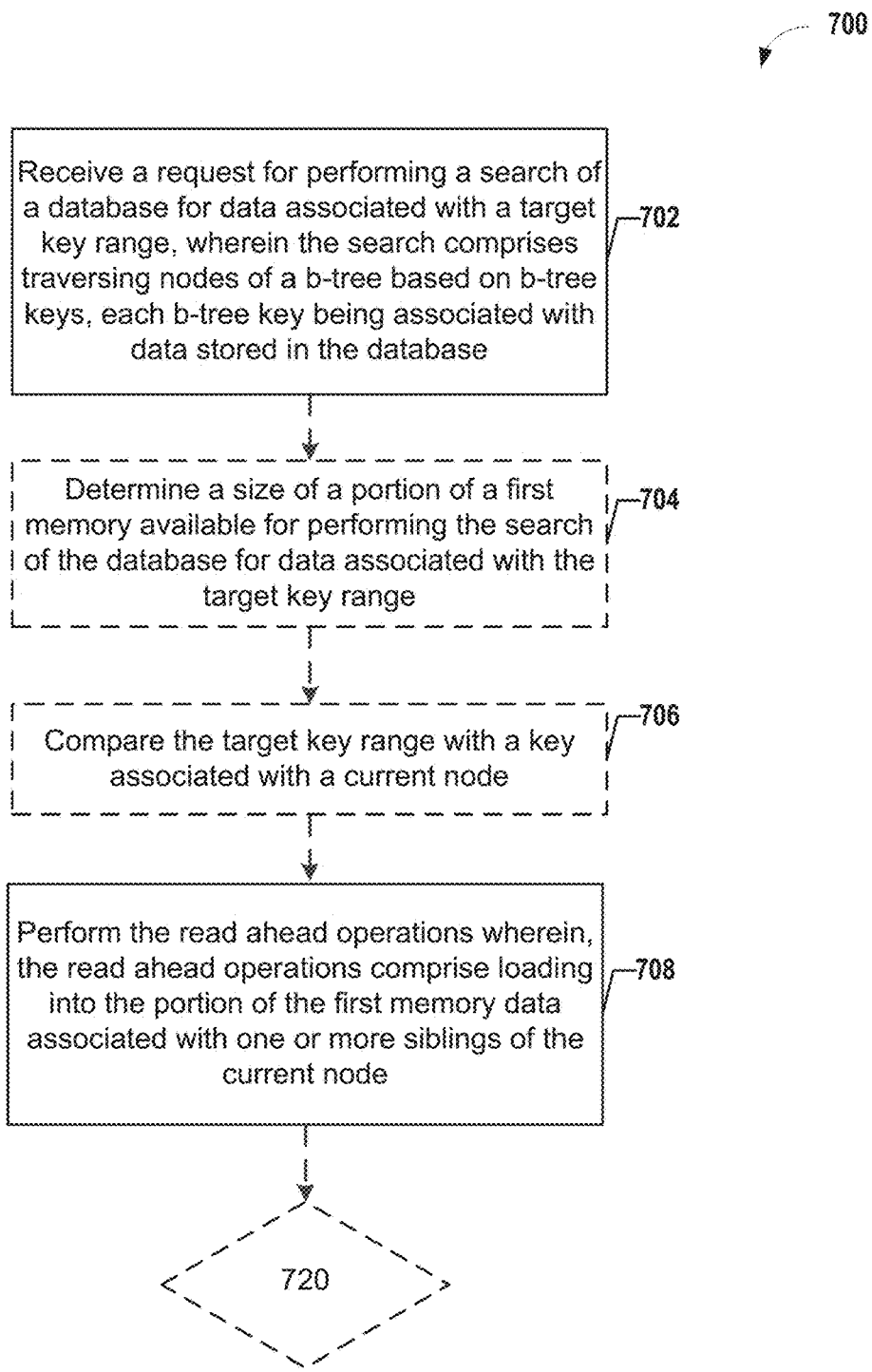
FIGS. 7-10 are flowcharts illustrating various procedures and operations that may be completed in accordance with various embodiments of the disclosure.

FIG. 7 is a flowchart illustrating an example process 700 that may be completed in accordance with various embodiments of the disclosure. The process 700 may begin with receiving a request for performing a search of a database for data associated with a target key range, wherein the database is stored in association with a b-tree and wherein the search comprises traversing nodes of the b-tree based on b-tree keys, each b-tree key being associated with data stored in the database (702). For example a database 608 may be associated with a b-tree (e.g., b-trees 100, 200, 300, 400A, 400B and/or the like). The database management and storage service 600 may receive a request for data search and retrieval. For example, the database management and storage service 600 may receive a request to retrieve data associated with a target key or a target key range, as described above with reference to FIGS. 4A and 4B. The search may include traversing at least one b-tree to identify the data responsive to the search. For example, a traversal path (e.g., traversal paths 102, 202, 302, 402A, 402B and/or the like) may be determined based on comparisons of key values of the b-tree with the target key value of the target key range. The traversal path may be tracked by a cursor or the like.

The process 700 may continue with optional step 704, shown in phantom. The process 700 may determine a size of a portion of a first memory available for performing the search of the database for data associated with the target key range (704). For example, an amount of available memory for pre-fetching operations may be determined based on multiple parameters as described herein.

The process 700 may then continue with optional step 706, shown in phantom. The process 700 may compare the target key range with a key associated with a current node (706). For example, the target key range may be compared with each traversed key to determine the path of traversal as described, for example, with reference to FIG. 4.

The process 700 may then continue with performing the read ahead operations wherein, the read ahead operations comprise loading, into the portion of the first memory, data associated with one or more siblings of the current node, wherein the one or more siblings of the current node are one or more nodes that have a same number of parent nodes as the current node (708). In one implementation, sibling nodes may be at a same level. In some implementations, sibling nodes may have a same total number of parents. For example, node 236 and node 234 are sibling nodes since they have the same number of parent nodes or are at the same level in the b-tree 200 hierarchy. In some implementations, siblings may share a common parent node either directly or indirectly. Accordingly, with reference to the b-tree 200, the current node (e.g., a node currently being traversed and/or a node that the cursor is currently on) may be node 234 and the sibling node may be node 236; therefore the data associated with the node 236 may be pre-fetched and loaded into the volatile memory 522. This allows for faster access of the data 204 which is data that is likely to be fetched or read by the database management and storage service 600.

Figure 8:
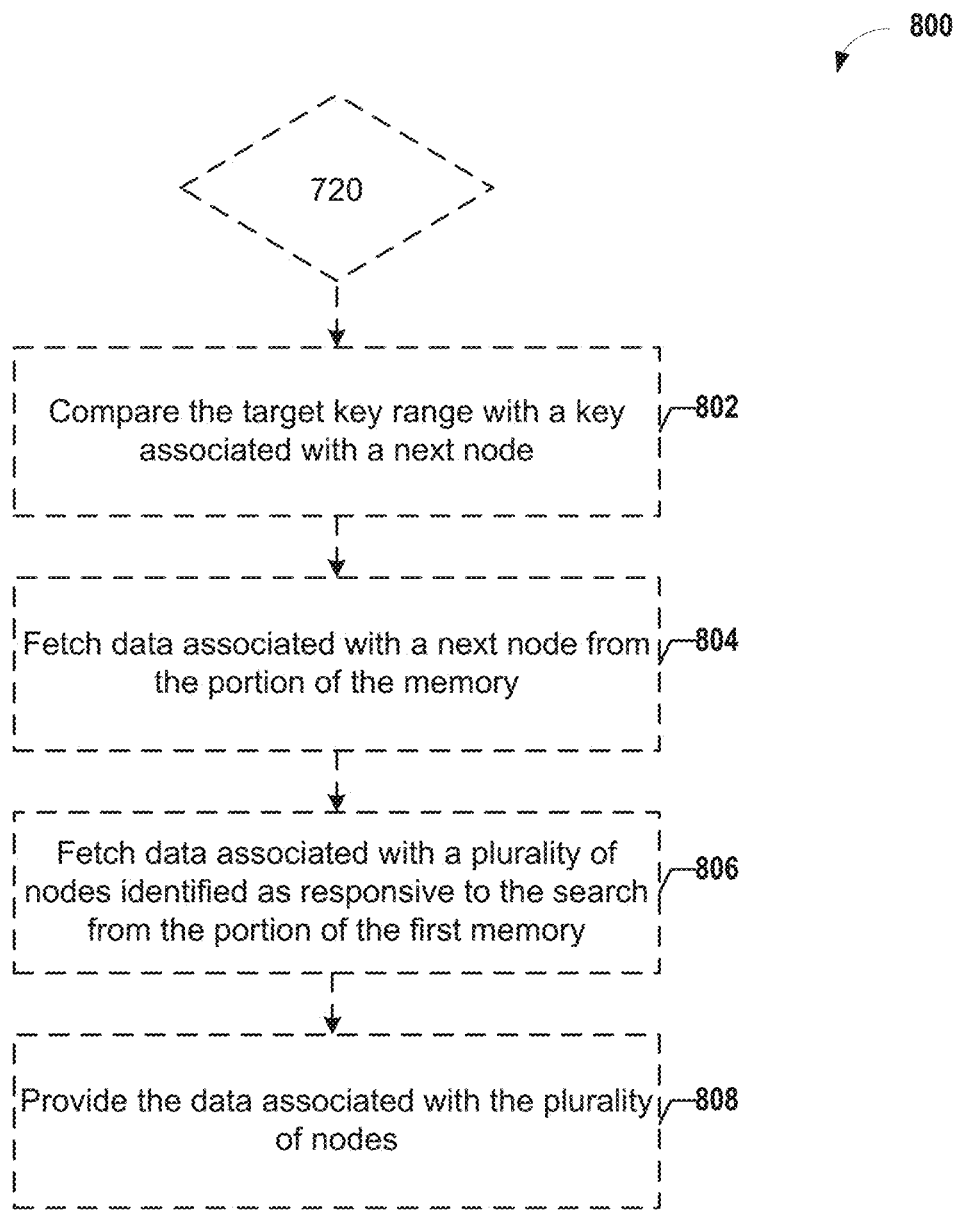

FIG. 8 is a flowchart illustrating an example process 800 that may be completed in accordance with various embodiments of the disclosure. The process 700 may optionally continue with the steps of the process 800. The process 800 begins with the optional step 802, shown in phantom. The process 800 compares the target key range with a key associated with a next node (802). For example, tracing the traversal path 102 of FIG. 1, the path moves from root node 106 to branch node 132. As described herein, the keys of node 132 are sequentially compared to the target key range to determine the traversal path forward.

The process 800 may, optionally, continue with fetching data associated with a next node from the portion of the memory (804). For example, with reference to FIG. 2, once the data 204 is pre-fetched and loaded into the volatile memory 522, the data may subsequently be fetched from the volatile memory 522 for processing at the time of processing. The process 800 may then, optionally, continue with fetching data associated with a plurality of nodes identified as responsive to the search from the portion of the first memory (806). For example, once traversal of the b-tree 200 is complete, the data found responsive to the search request may be fetched from the volatile memory 522. As noted above, retrieval of the data from the volatile memory 522 may be faster that retrieving the data directly from database 608. The process 800 may then, optionally, continue with providing, over at least one network, the data associated with the plurality of nodes (808). For example, the data found responsive to the search request may be fetched from the volatile memory 522 and provided to the user devices 602A-602N and/or the client devices 604A-604N over the network 606.

Figure 9:
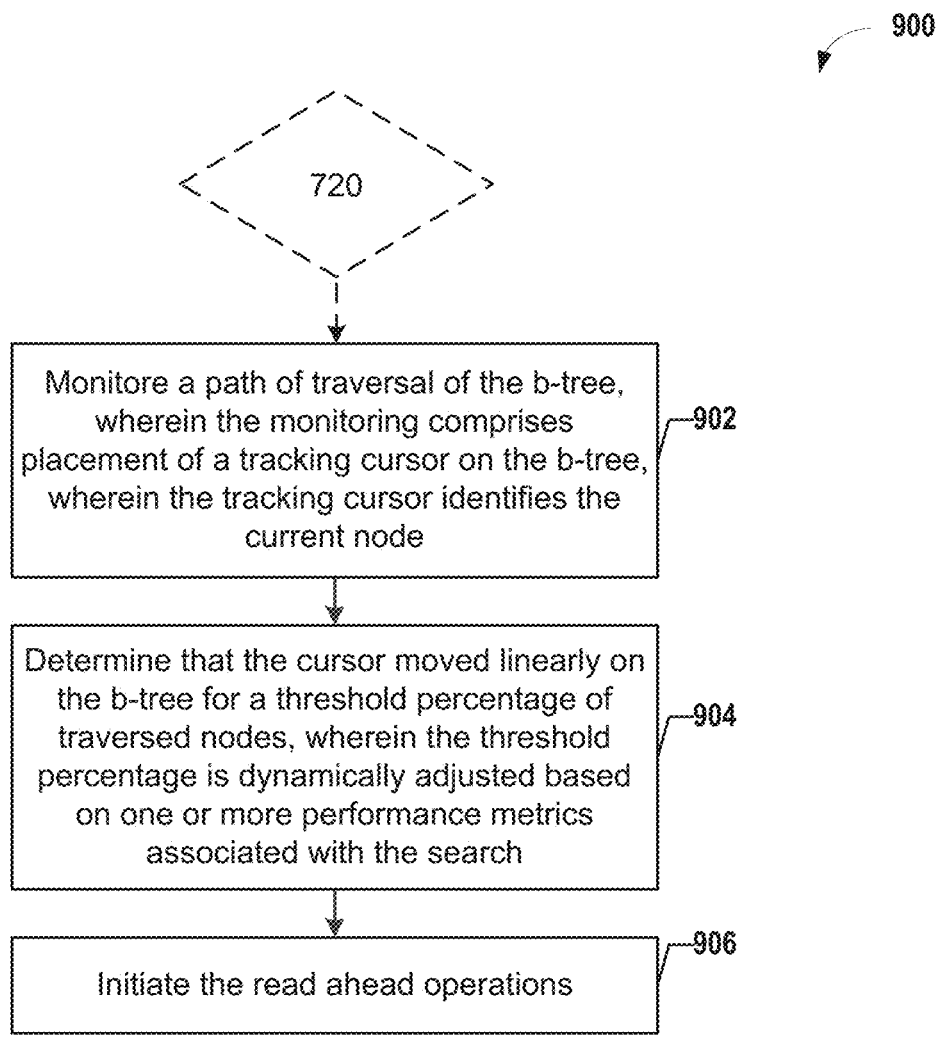

FIG. 9 is a flowchart illustrating an example process 900 that may be completed in accordance with various embodiments of the disclosure. The process 700 may optionally continue with the steps of the process 900. The process 900 may begin with monitoring a path of traversal of the b-tree, wherein the monitoring comprises placement of a tracking cursor on the b-tree, wherein the tracking cursor identifies the current node (902). For example, a cursor or a marker may move along the traversal path 102 as the traversal process is being completed. The movement of the cursor or the marker may define or draw the traversal path 102.

The process 900 may continue with determining that the cursor moved linearly on the b-tree for a threshold percentage of traversed nodes, wherein the threshold percentage is dynamically adjusted based on one or more performance metrics associated with the search (904). For example, the process 900 may determine that the cursor associated with the traversal path 102 moved linearly for 80% or more of the nodes or keys traversed. In some implementations, the threshold may be adjusted periodically and/or dynamically. In one implementation, a feedback loop may be used to adjust the threshold based on one or more performance measures. The performance measure may be, for example, efficiency, utilization, power consumption, speed and/or the like. Other methods may be used to dynamically adjust the threshold such as, for example, machine learning (e.g., neural networks, genetic algorithms and/or the like.) In response, the process 900 may continue with initiating the read ahead operations (906).

Figure 10:
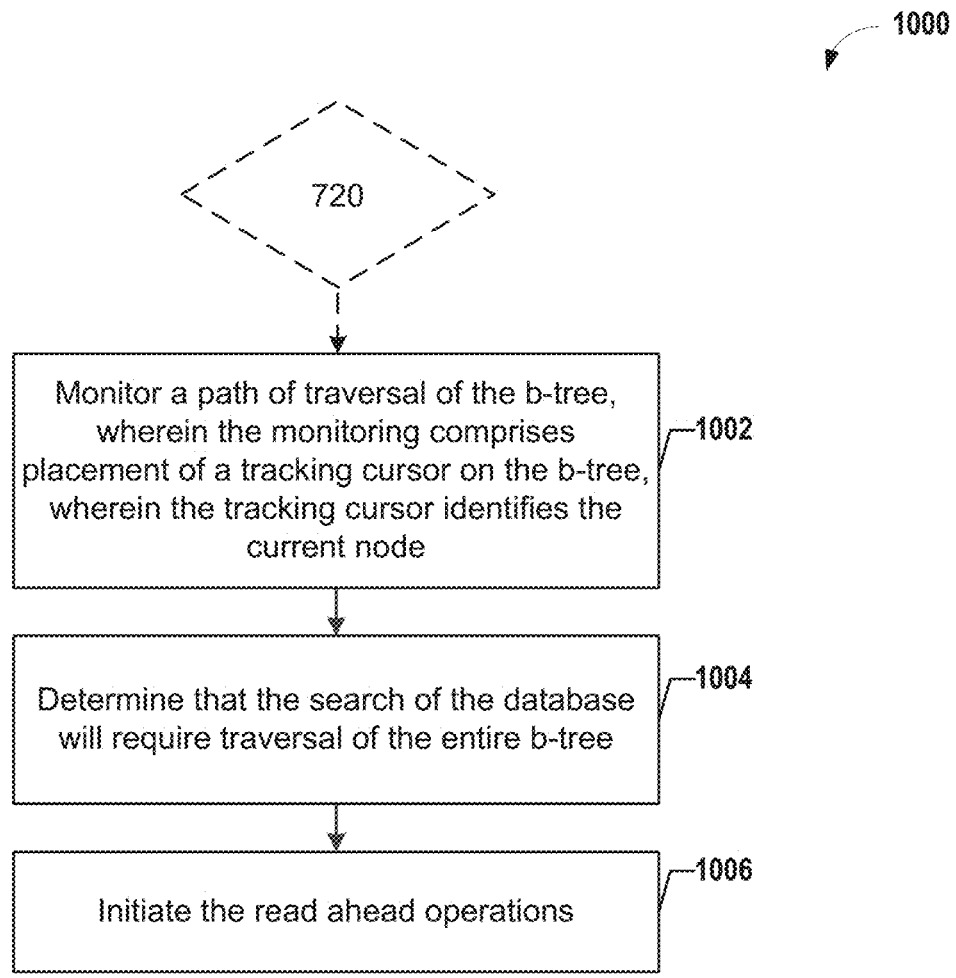

FIG. 10 is a flowchart illustrating an example process 1000 that may be completed in accordance with various embodiments of the disclosure. The process 700 may optionally continue with the steps of the process 1000. The process 1000 may begin with monitoring a path of traversal of the b-tree, wherein the monitoring comprises placement of a tracking cursor on the b-tree, wherein the tracking cursor identifies the current node (1002). For example, a cursor or a marker may move along the traversal path 302 as the traversal process is being completed. The movement of the cursor or the marker may define or draw the traversal path 302.

In turn, the process 1000 may determine that the search of the database will require traversal of the entire b-tree (1004). For example, the process 1000 may determine that the entire b-tree 300 will be traversed and/or all data associated with the b-tree 300 will be fetched. In response, the process 1000 may continue with initiating the read ahead operations (1006). For example, the process 1000 may pre-fetch data 304A-304I either sequentially (downward and from left to right or downward from right to left) or non-sequentially and load it into volatile memory 522.

It should be understood that the processes, operations and functionality described above may be implemented in a plurality of systems. For example, the processes, operations and functionality above may be implemented in external and/or internal systems. Similarly, the processes, operations and functionality above may be implemented in a display device such as a television, monitor, laptop, table, mobile phone, gaming console and/or the like.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

ADDITIONAL IMPLEMENTATION DETAILS

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving a request to perform a search associated with a target key range on a database;
   determining a size of a memory of a device available for performing the search, wherein the database is stored in association with a b-tree and wherein the search comprises traversing nodes of the b-tree based, at least in part, on b-tree keys, each b-tree key being associated with respective data stored in the database, wherein the search comprises comparing the target key range with the b-tree keys associated with the nodes of the b-tree to determine a path for traversal of the b-tree, the path being defined by movements of a cursor on the b-tree, the cursor identifying at least a first node at which the target key range is compared with a b-tree key associated with the first node;
   determining a parameter indicative of a performance of the database, the performance associated with operations different than the b-tree;
   determining, based at least in part on the size of the memory and the parameter, at least a portion of the memory of the device to allocate for read ahead operations, wherein the b-tree is stored on a data processing apparatus of the device;
   determining that at least one sibling node is associated with read ahead data;
   loading, from the data processing apparatus of the device and prior to the cursor reaching a second b-tree key, read ahead data associated with, at least, the second b-tree key into the portion of the memory of the device; and
   performing the read ahead operations on the read ahead data, wherein the read ahead operations comprise, at least, the loading.

2. The method of claim 1, further comprising:
   determining that the cursor moved to the at least one sibling node, wherein the read ahead data was previously loaded into the portion of the memory; and
   fetching the data associated with the at least one sibling node from the portion of the memory, wherein the at least one sibling node shares at least one immediate parent node.

3. A system, comprising:
   a data processing apparatus of a first device; and
   a memory of the first device in data communication with the data processing apparatus of the first device and storing instructions executable by the data processing apparatus of the first device that upon such execution cause the data processing apparatus of the first device to perform operations comprising:
   receiving, from a second device, a request to perform a search of a database for data associated with a target key range, wherein the database is stored in association with a b-tree and wherein the search comprises traversing nodes of the b-tree based, at least in part, on b-tree keys, at least a first b-tree key being associated with data stored in the database;
   determining a parameter indicative of a performance of the system, the performance associated with operations different than the b-tree;
   determining, based at least in part on the parameter, a portion of the memory of the first device to allocate for read ahead operations, wherein the b-tree is stored on the data processing apparatus of the first device;
   comparing the target key range with a b-tree key associated with a first node;
   identifying one or more sibling nodes of the first node;
   loading, from the data processing apparatus of the first device and into the portion of the memory of the first device, data associated with one or more sibling nodes of the first node; and
   performing the read ahead operations on the data associated with the one or more sibling nodes, wherein the read ahead operations comprise, at least, the loading.

4. The system of claim 3, wherein the one or more sibling nodes of the first node are at a same level as the first node and have a same number of total parent nodes.

5. The system of claim 3, wherein the one or more sibling nodes are located on the b-tree in a same direction relative to the first node.

6. The system of claim 5, wherein the direction is a direction of a path of traversal of the b-tree.

7. The system of claim 3, wherein the operations further comprise:
   determining, a first amount of data associated with the one or more sibling nodes that can be loaded into the portion of the memory;
   selecting a set of the one or more sibling nodes; and
   loading the data associated with the set of the one or more sibling nodes into the portion of the memory.

8. The system of claim 3, wherein the operations further comprise:
   comparing the target key range with a key associated with a second node;
   determining that the key associated with the second node is within the target key range; and
   fetching the data associated with the second node from the portion of the memory.

9. The system of claim 3, wherein the operations further comprise:
    fetching data associated with a plurality of nodes identified as responsive to the search from the portion of the memory; and
    providing, to the second device, the data associated with the plurality of nodes.

10. The system of claim 3, wherein the operations further comprise monitoring a path of traversal of the b-tree, wherein the monitoring of the path of traversal comprises tracking a cursor on the b-tree.

11. The system of claim 10, wherein the operations further comprise:
    determining that the cursor moved consecutively on the b-tree in a first direction for a threshold percentage of traversed nodes; and
    initiating the read ahead operations.

12. The system of claim 11, wherein the threshold percentage is between 50% and 80%, and wherein the threshold percentage is dynamically adjusted based at least in part on one or more performance metrics associated with the search.

13. The system of claim 10, wherein the operations further comprise:
    determining that the search of the database will include traversal of the b-tree substantially in its entirety; and
    initiating the read ahead operations.

14. The system of claim 10, wherein the one or more sibling nodes share at least one immediate parent node.

15. The system of claim 3, wherein the operations further comprise:
    comparing the target key range with a key associated with a second node;
    determining that the key associated with the second node is outside the target key range; and
    deleting the data associated with the second node from the portion of the memory.

16. A non-transitory computer-readable storage medium having computer-readable program code portions stored thereon that, when executed by one or more computing devices, cause the computing devices to perform operations comprising:
    receiving a request to perform a search of a database for data associated with a target key range, wherein the database is stored in association with a b-tree and wherein the search comprises traversing nodes of the b-tree based, at least in part, on b-tree keys, at least a first b-tree key being associated with data stored in the database;
    determining a parameter indicative of a performance of the database, the performance associated with operations different than the b-tree;
    determining, based at least in part on the parameter, a portion of a memory of a device to allocate for read ahead operations, wherein the b-tree is stored on a data processing apparatus of the device;
    comparing the target key range with a b-tree key associated with a first node;
    identifying one or more sibling nodes of the first node;
    loading, from the data processing apparatus of the device and into the portion of a memory of the device, data associated with one or more sibling nodes of the first node; and
    performing the read ahead operations on the data associated with the one or more sibling nodes, wherein the read ahead operations comprise, at least, the loading.

17. The non-transitory computer-readable storage medium of claim 16, wherein the operations further comprise:
    determining that a tracking cursor moved consecutively on the b-tree in a first direction for a threshold percentage of traversed nodes; and
    initiating the read ahead operations.

18. The non-transitory computer-readable storage medium of claim 16, wherein the operations further comprise:
    comparing the target key range with a key associated with the one or more sibling nodes; and
    fetching the data associated with the one or more sibling nodes from the portion of the memory.

19. The system of claim 3, wherein the parameter comprises at least one of a number of users accessing the database, a computational stress associated with use of the database, a processing speed of the database, or a throughput rate associated with the system.

20. The non-transitory computer-readable storage medium of claim 16, wherein the parameter comprises at least one of a number of users accessing the database, a computational stress associated with use of the database, a processing speed of the database, or a throughput rate associated with the one or more computing devices.

* * * * *